(12) United States Patent
Link (10) Patent No.: US 8,421,587 B2
(45) Date of Patent: Apr. 16, 2013

(54) DIAGNOSIS FOR MIXED SIGNAL DEVICE FOR USE IN A DISTRIBUTED SYSTEM

(75) Inventor: Leonhard Link, Kirchseeon (DE)

(73) Assignee: Freescale Semiconductor, Inc., Austin, TX (US)

( * ) Notice: Subject to any disclaimer, the term of this patent is extended or adjusted under 35 U.S.C. 154(b) by 683 days.

(21) Appl. No.: 12/597,132

(22) PCT Filed: Apr. 26, 2007

(86) PCT No.: PCT/IB2007/051547
§ 371 (c)(1),
(2), (4) Date: Oct. 22, 2009

(87) PCT Pub. No.: WO2008/132555
PCT Pub. Date: Nov. 6, 2008

(65) Prior Publication Data
US 2010/0117788 A1    May 13, 2010

(51) Int. Cl.
*G05B 23/00*      (2006.01)
(52) U.S. Cl.
USPC .......................................................... 340/5.1
(58) Field of Classification Search .................. 340/3.1, 340/5.1, 3.31, 3.32, 14.61
See application file for complete search history.

(56) References Cited

U.S. PATENT DOCUMENTS

| 5,123,017 | A | | 6/1992 | Simpkins et al. |
| 5,426,585 | A | * | 6/1995 | Stepper et al. .................. 702/85 |
| 5,450,321 | A | * | 9/1995 | Crane .......................... 701/31.6 |
| 5,638,273 | A | * | 6/1997 | Coiner et al. ................ 701/33.4 |
| 5,957,986 | A | * | 9/1999 | Coverdill ..................... 701/33.4 |
| 6,028,505 | A | * | 2/2000 | Drori ....................... 340/426.17 |
| 6,105,155 | A | | 8/2000 | Cheng et al. |
| 6,304,921 | B1 | * | 10/2001 | Rooke ............................... 710/4 |
| 6,542,076 | B1 | * | 4/2003 | Joao .......................... 340/539.14 |
| 7,233,335 | B2 | * | 6/2007 | Moreton et al. .............. 345/522 |
| 2006/0075009 | A1 | | 4/2006 | Lenz et al. |

FOREIGN PATENT DOCUMENTS

| GB | 2372862 A | 4/2002 |
| WO | 98/39718 | 8/1998 |
| WO | 2005/078465 A1 | 8/2005 |

OTHER PUBLICATIONS

PCT/IB2007/051547 International Search Report and Written Opinion mailed Mar. 6, 2008.

* cited by examiner

*Primary Examiner* — Vernal Brown (57) ABSTRACT

A mixed signal device for use in a distributed system of independent and interoperating devices, comprising at least one analog module, characterized in that the mixed signal device further comprises a diagnosis controller coupled to the at least one analog module, said diagnosis controller being operable to determine an operational status of the mixed signal device.

20 Claims, 8 Drawing Sheets

DIAGNOSIS FOR MIXED SIGNAL DEVICE FOR USE IN A DISTRIBUTED SYSTEM

FIELD OF THE INVENTION

This invention relates to a mixed signal device for use in a distributed system, a distributed system, a method of determining operational status information of a distributed system, a computer program product and an apparatus including a mixed signal device.

BACKGROUND OF THE INVENTION

Embedded systems are combinations of computer hardware and software, together with additional inputs (e.g. sensors, switches and the like) and outputs (such as actuators, or driving circuits, and the like) that are designed together as a system to carry out a particular function, or set of functions. Industrial machines, automobiles, consumer electronics, PDAs, mobile phones, household appliances and medical equipment are all examples of such embedded systems.

Embedded systems may be considered a form of distributed system, where a number of independent devices interoperate with each other to carry out the intended system functions.

Figure 1:
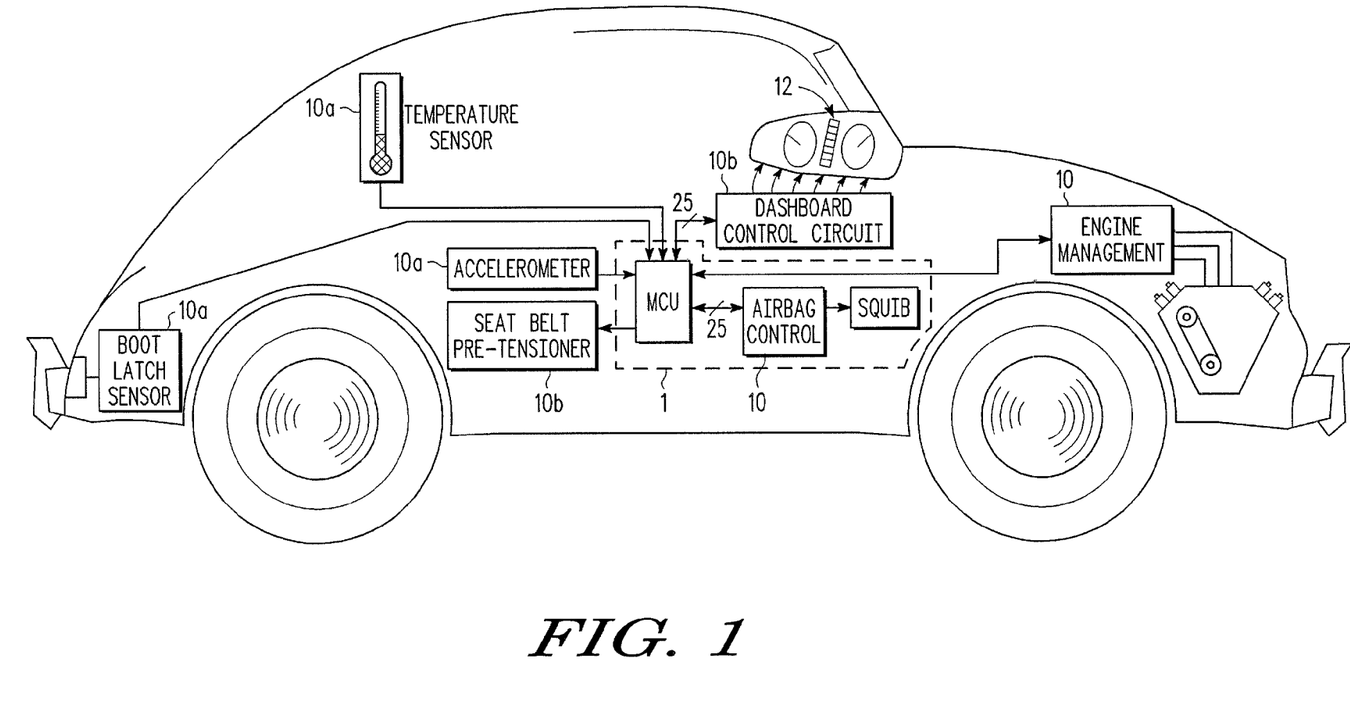
FIG. 1 is a schematic diagram showing an exemplary use of a mixed signal distributed system in a vehicle.

Distributed systems are typically used to control the functioning of some process, such as a manufacturing process in a factory, or the functioning of a machine, such as a car, or other vehicle. A classic example of a distributed system is an electronic control system for a car, incorporating such things as the control system for the airbags, the electronic engine management system and the like. An example of a distributed system in this context is shown in FIG. 1 of the drawings.

When using a distributed system comprising two or more independent, interoperating devices, where the function of the system as a whole is distributed across the independent devices, it is desirable to be able to validate the operational status of the system as a whole, in order to determine that the entire system is operating correctly. This is particularly so in the case of safety critical systems, such as the above mentioned airbag control systems found in vehicles. The validation of the operational status of a system is also known as diagnosis of the system. Although diagnosis may be carried out continuously throughout the operating life of a distributed system, due to the bandwidth requirements, it is often only carried out on initialisation, or start up, of the distributed system.

Typically, distributed systems control or sense different parameters of the process or machine being controlled, and activate means dependent upon the sensed parameters. For example, in a vehicle, the airbag control system may be continually sensing the acceleration rate of the vehicle, ready to fire the airbag detonators upon sensing a rapid deceleration. Thus, embedded/distributed systems typically require real world signals to be encoded into digital representations, for processing digitally within the embedded system, as well as digital signals to be outputted into the analog world, using actuators or other output devices. Therefore, typically, embedded/distributed systems have both digital and analog circuit portions, and are thus termed 'mixed signal'. Examples of the analog portions are various sensors, current sources, voltage sources, voltage regulators analog to digital converters, and the like, meanwhile examples of the digital portions include processors and control logic, often in the form of fixed function state machines.

Distributed systems typically comprise a number of remote mixed signal devices (devices containing both digital and analog modules) that are controlled by a central Master Microcontroller Unit (MCU) that is in charge of the system operation as a whole. Also, typically, such distributed systems are connected by low bandwidth communications links, for example, Serial Peripheral Interface (SPI) communication links.

In the known methods of validating distributed systems, the main or master device retrieves and validates the operational status of all the linked remote mixed signal devices. This involves sending diagnosis control signals to the remote mixed signal devices, to control the diagnosis of the linked device, and receiving operational status information back from the linked devices once the particular diagnosis task is finished on that device. Triggering and retrieving the diagnosis responses from the other devices in the distributed system create high traffic load on the connecting links. Furthermore, the diagnosis function provokes a high load on the master device's system resources.

Furthermore, the sending of control signals to the linked device under diagnosis test must often be carried out in a tightly time coupled fashioned (i.e. the control signals must be sent in a particular and timely order, to ensure the distributed system as a whole is operating as the designers intended). The tight time requirements place even more strain on the communication links between the interoperating devices, often resulting in the slowing down of the distributed system as a whole. This is because of the high load on the master device (e.g. MCU) caused by requesting and evaluating the diagnosis data, as well as the large amount of traffic being sent over the communication links and the high utilisation of the linked interoperating device. Thus diagnosis of a distributed system generally causes a higher unavailability of the system components.

Thus it would be desirable to reduce diagnosis resource usage in distributed systems.

SUMMARY OF THE INVENTION

The present invention provides a mixed signal device, a distributed system, and a method of determining operational data.

BRIEF DESCRIPTION OF THE DRAWINGS

A mixed signal device, distributed system and method, in accordance with the present invention will now be described, by way of example only, with reference to the accompanying drawings, in which.

Items that remain the same or remain functionally similar retain the same reference numerals throughout the drawings.

DETAILED DESCRIPTION OF THE PREFERRED EMBODIMENTS

The following description is primarily focused on the diagnosis function of a distributed system having at least two independent and interoperating devices, such as one or more remote mixed signal devices under the control of a master microcontroller unit (MCU).

As previously mentioned, the diagnosis function of a distributed system is its ability to determine an operational status, including response characteristic, of the distributed system as a whole. It will be appreciated that the diagnosis function is carried out on the same general hardware (i.e. master and remote devices, and the communication links there between) upon which the functions of the system are carried out. Thus, the diagnosis functions impinge on the speed (or even outright ability) of the system to carry out its intended function(s).

FIG. 1 shows an example mixed signal distributed system in a vehicle, where a master microcontroller unit (MCU) 20 is connected to a number of remote devices 10. The remote devices may be input devices, such as sensors 10*a*, or they may be output devices, such as actuating circuits 10*b*. Equally, a single remote device 10 might be a mixture of inputs and outputs.

Examples of typical sensors found in a vehicle would include accelerometers (for detecting the amount of acceleration or deceleration the vehicle is experiencing at a particular moment in time, and which would be indicative of a potential impending collision), temperature sensors (to indicate overheating, and the like), or mechanical sensors (for detecting the physical orientation of vehicle parts, and the like). Meanwhile, examples of the sorts of actuator circuits found in vehicles would include the lamp driver circuits for the dashboard indicator lamps 12, seat belt pre-tensioners, or airbag explosive squib circuits. However, it will be apparent to the skilled person that other sensors and actuators may also be involved.

An example of a distinct operation carried out by the distributed system of FIG. 1 would be the booth latch sensor 10*a* sensing that the boot is still open, and lighting up a lamp 12 in the dashboard to signify this to the vehicle driver. Another example would be an accelerometer sensor coupled to the MCU 20, for sensing the rapid deceleration of the vehicle in order to deploy the seat belt pre-tensioners in the case of a crash.

The present invention will now be explained in the context of a simple two device distributed system 1, as shown in FIG. 1 surrounded by a dashed line. For ease of explanation, the mixed signal device will be considered as generic and only those parts of the mixed signal device that are relevant to the invention will be described herein.

Figure 2:
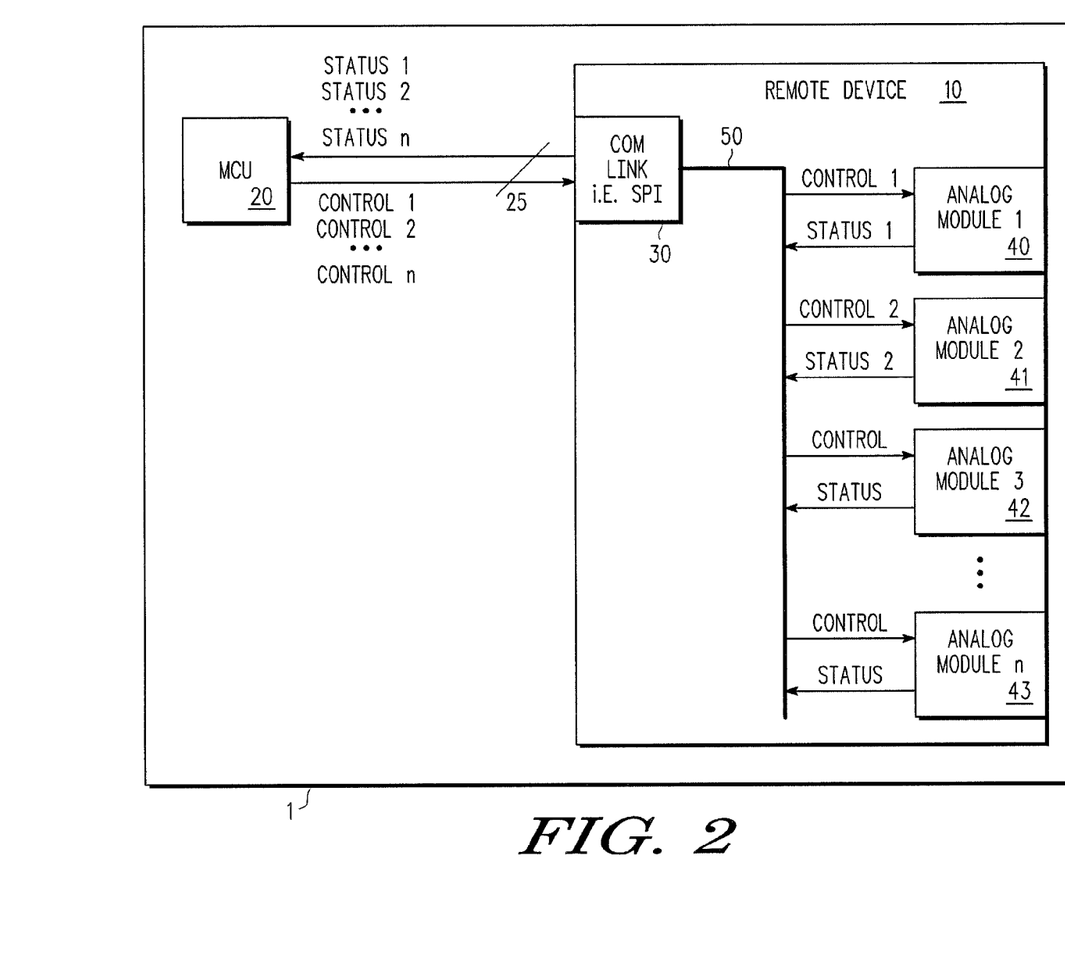
FIG. 2 is a block schematic diagram of a prior art mixed signal device, in communication with an MCU.
Figure 3:
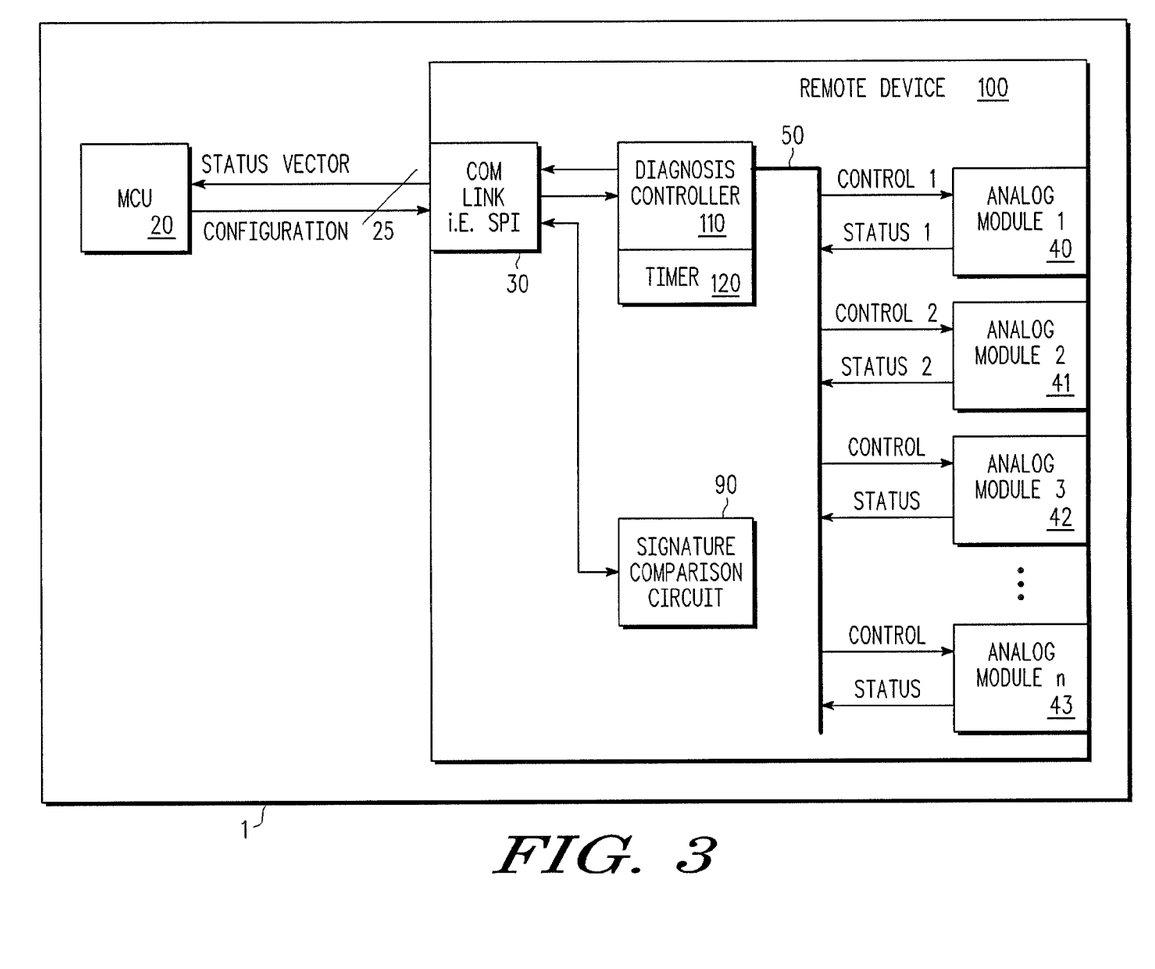
FIG. 3 is a block schematic diagram of a mixed signal device in accordance with one embodiment of the invention, given by way of example only, again in communication with an MCU.

FIG. 2 shows an example of a distributed system 1 according to the prior art, while FIG. 3 shows a similar implementation of a two device distributed system 1, but this time according to the invention.

In FIG. 2 a remote mixed signal device 10 according to the prior art is coupled to a master MCU 20 using a low bandwidth communication link 25, such as a Serial Interface (SPI) communications link. The remote device 10 comprises a communications link interface 30, a number of analog modules 40 . . . 43, and an internal bi-directional communications bus 50, for coupling the analog modules to the communications interface 30.

In the context of the operational status diagnosis function only, the MCU 20 sends diagnosis control data signals to the remote device 10, to carry out the diagnosis function. The diagnosis function may include querying the status of the mixed signal device 10 (for example operating voltage levels of certain components, bias values, and the like) and determining the mixed signal device's response to a particular set of input parameters. The diagnosis control signals are sent over the low bandwidth communication link 25, to a communications link interface 30 on the remote device 10.

The diagnosis control data is forwarded to the relevant selected analog module 40 . . . 43 using a bi-directional bus 50. The bi-directional bus 50 carries the control signals incoming from the MCU 20 over the communication link 25 to the selected analog module under diagnosis control. While the relevant diagnosis function is carried out, the bus 50 carries the full raw diagnosis response data signals, ie. operational status information, back from the selected analog module to the MCU 20, via the SPI communications link interface 30, for analysis by the MCU 20.

Typically, the diagnosis function of a particular remote mixed signal device 10 is carried out by a basic fixed function state machine (not shown) within the remote mixed signal device 10, acting upon the full diagnosis control data incoming from the master MCU 20.

Also, the diagnosis function typically involves tightly time coupled tasks (for example timely trigger requests and their responses), in order to accurately test whether a particular analog module 40 . . . 43 will respond correctly, in time, and in the right order. Thus, in the prior art device, the communication links 25 are often saturated with these trigger requests, or at least the available bandwidth over the communication links 25 is much reduced. This is most often the case in the start up/initialisation process for the distributed system 1.

When this saturation or bandwidth reduction occurs, the communications links 25 are no longer fully available for carrying out the actual system functions (i.e. intended application functions) and thus distributed systems 1 having mixed signal devices 10 according to the prior art suffer slow down during this start-up phase, and even later if the diagnosis function is ongoing. Alternatively, for example in the case where the system is primarily returning sensor data to the MCU 20, the amount of sensor data that can be carried, and when, is affected by the lack of available remaining bandwidth, after the diagnosis response are taken into account.

FIG. 3 shows a mixed signal device 100 according to an embodiment of the present invention, in the same simple two device distributed system 1.

In overview, the remote mixed signal device 100 according to the present invention incorporates a diagnosis controller 110 such that the diagnosis function (to determine an operational status of the remote mixed signal device 100) can be controlled locally to the remote mixed signal device 100, and the results reported back to the master microcontroller unit (MCU) 20. In this way, the diagnosis function is decentralised away from the master MCU device 20, allowing autonomous diagnosis execution on a remote mixed signal device 100, but still supervised by the master device 20. Reliability of the diagnosis function is also maintained, if not improved, due to the strengthening of the resources carrying out the diagnosis function. The autonomous diagnosis results (i.e. operational status information) are then summarized and transmitted back to the master MCU 20, or equivalent.

In an embodiment, the diagnosis controller 110 is programmable, for example, by being formed from a processor and associated programmable memory, such that the diagnosis scope (i.e. the particular set of diagnosis tests to carry out, and the like) and diagnosis configuration (the diagnosis code) can be downloaded as diagnosis code to the associated memory during start-up/initialisation or even during the ongoing operation of the distributed system 1.

In an embodiment, the diagnosis code is secured prior to sending to the diagnosis controller. This is to ensure that no erroneous diagnosis code is loaded, and thus introduces a further layer of security and reliability into the resultant system. Exemplary methods of securing the diagnosis data include Cyclical Redundancy Check (CRC) signature creation or MD5/SHA-1 hash functions.

The diagnosis code may be operable to control the attached actuators and other analog modules 40 . . . 43 of the remote mixed signal device 100. This would include checking the feedback of both inoperative and engaged actuators, and the like.

The diagnosis controller 110 includes a local timer 120, to allow it to carry out the tightly time coupled diagnosis tasks reliably and autonomously from the master MCU 20. Tightly time coupled diagnosis tasks would include repetitive, interrupt driven or timing constrained tasks that would otherwise cause fragmented main-code execution on master MCU 20, if the MCU has to carry out the diagnosis function as well as the main application (see FIGS. 7 and 8). With the approach described herein, the timing control is placed into the remote mixed signal device 100, and thus software development for the distributed system 1 becomes easier, and MCU 20 timing resources are freed up for additional tasks.

The timer 120 is in an embodiment, a trimmed timer, i.e. an accurate timer, enabling accurate diagnosis function testing and the like. It may be either synchronous with other timers in the distributed system 1, else it may be asynchronous, since it is primarily used for tasks local to the mixed signal device 100.

Figure 4:
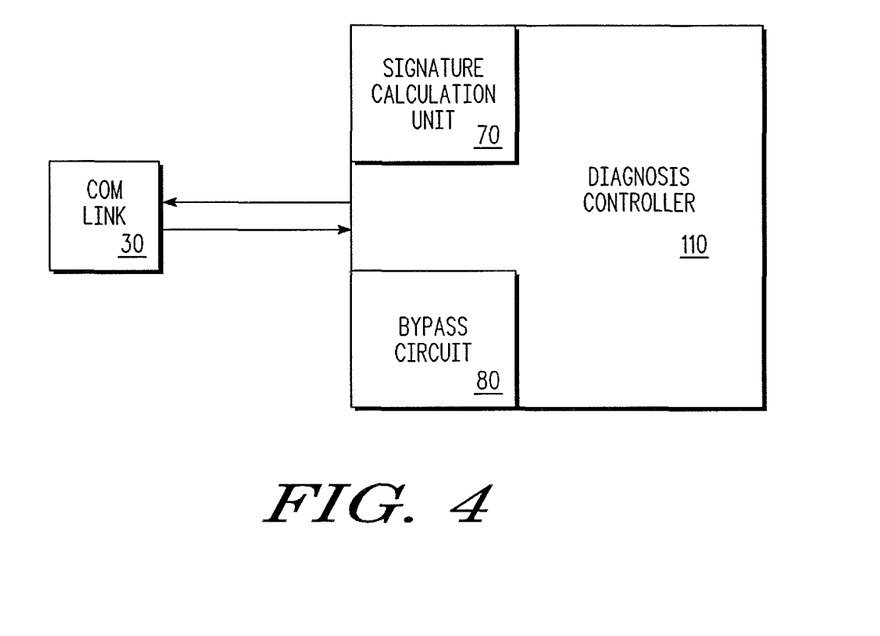
FIG. 4 is a more detailed schematic view of the diagnosis controller of an embodiment of the present invention.

In an embodiment, the diagnosis controller 110 local to the remote mixed signal device 100 also includes an operational status information compression unit 70 as shown in FIG. 4, for compressing the operational status information prior to sending over the communications link 25. In this way, the bandwidth requirements of the diagnosis function is reduced, since the amount of data sent between remote devices 100 and the MCU 20 is reduced.

In an embodiment, the operational status information compression unit 70 comprises a CRC signature calculation unit that compacts the operational status information into a unique digital signature, or digest, that is much shorter than the original raw operational status information. Furthermore, using a unique signature ensures the reliability of the compressed information, because the signature accurately encapsulates all the operational status information, and thus changes (due to both changes in the operational status information and errors introduced during transmission) are detectable.

To connect the one or more analog modules 40 . . . 43 to the diagnosis controller 110, the remote mixed signal device 100 also includes a bi-directional communications bus 50. This allows the diagnosis controller 110 to carry out the diagnosis function on each analog module 40 . . . 43, either separately, or in combination where necessary (for example, when the tightly time coupled actuation signals involve more than one of the analog modules 40 . . . 43).

When a particular analog module 40 . . . 43 is under diagnosis testing, the bi-directional communications bus 50 may operate like a multiplexer, to multiplex the operational status information of the particular one of the analog modules 40 . . . 43 into the operational status information compression unit 70. The bi-directional bus 50 selects a particular analog module 40 . . . 43 as the input, under control of the diagnosis controller 110 or operational status information compression unit 70.

The MCU 20 checks that a particular analog module 40 . . . 43, or other sub-portion, of the distributed system is operating correctly by checking that any signatures received from the particular analog module 40 . . . 43 match expected signatures for that analog module 40 . . . 43. The respective signatures are received by the MCU 20 from the diagnosis controller 110 of the mixed signal device 100 containing the particular analog module 40 . . . 43 under test over the communications link 25.

The expected signatures may be determined during system design, else are calculated on the fly by the MCU 20, or other processing means within the distributed system 1, during operation. Any mismatch between the actual and expected signatures indicate a deviation from the expected behaviour of the particular portion (e.g. analog module 40 . . . 43) of the system 1. In the case that a signature mismatch occurs, and thus an error in the operation of the system 1 has been detected, depending on the design of the system 1 or where the error occurred, the MCU 20 can either halt the system 1, query the erroneous portion of the distributed system 1 further, or simply indicate an error to a user (for example, by lighting a warning lamp when an actuator has gone wrong, and therefore requires servicing).

In a embodiment, remote mixed signal devices 100 only send signatures indicative of the operational status of their portion of the distributed system 1 upon receiving a request for the signature from the MCU 20. This reduces the diagnosis bandwidth requirements to their lowest. However, in the case where higher bandwidth links are used between the remote devices 100 and the MCU 20, the signatures may be sent periodically instead.

FIG. 4 shows the diagnosis controller 100 in more detail.

Depending upon system design parameters, e.g. the type of compression used, the diagnosis controller 110 may further comprise a bypass unit 80, to allow the operational status compression unit 70 to be bypassed. The bypass unit 80 may be incorporated in the case where lossy compression, such as CRC signature compaction, of the operational status information is used. Thus, the bypass unit 80 may be used when an operational status information comparison mismatch occurs (see below for more information), and the system 1, in particular the master MCU 20 at the other end of the communication link 25, requires the full uncompressed operational status information for further analysis.

In an embodiment, the remote mixed signal device 100 also includes a comparison circuit 90 for comparing a signature received from another device 100 in the system, or the master MCU 20, to a pre-calculated expected signature. Where a signature calculation unit 70 and comparison unit 90 are included in each remote mixed signal device 100 within the distributed system 1, the remote mixed signal devices 100 can cross check each other's operation. In this way, the surveillance of the distributed system's operation can be distributed over the whole system, rather than be centralised in the master control device, e.g. MCU 20.

The comparison circuit 90 may include a memory to store pre-calculated expected signatures, or may include processing means to pre-calculate expected signatures on the fly. A mix of the two types (pre-storage and pre-calculation) might also be employed.

The master control device, e.g. MCU 20, may also contain a signature calculation unit (not shown), such as the unit 70 of the remote mixed signal device 100, to enable the responses of the MCU 20 to be cross checked by any connected remote mixed signal devices 100. However, since the MCU 20 is a general processor, this signature calculation function, or indeed any of the other sub-functions of the MCU 20 maybe carried out by suitable software running on the MCU 20. FIG. 4 shows the diagnosis controller 100 in more detail, in particular, the operational status information compression unit 70, in the form of a signature calculation unit 70, and bypass circuit 80.

Figure 5:
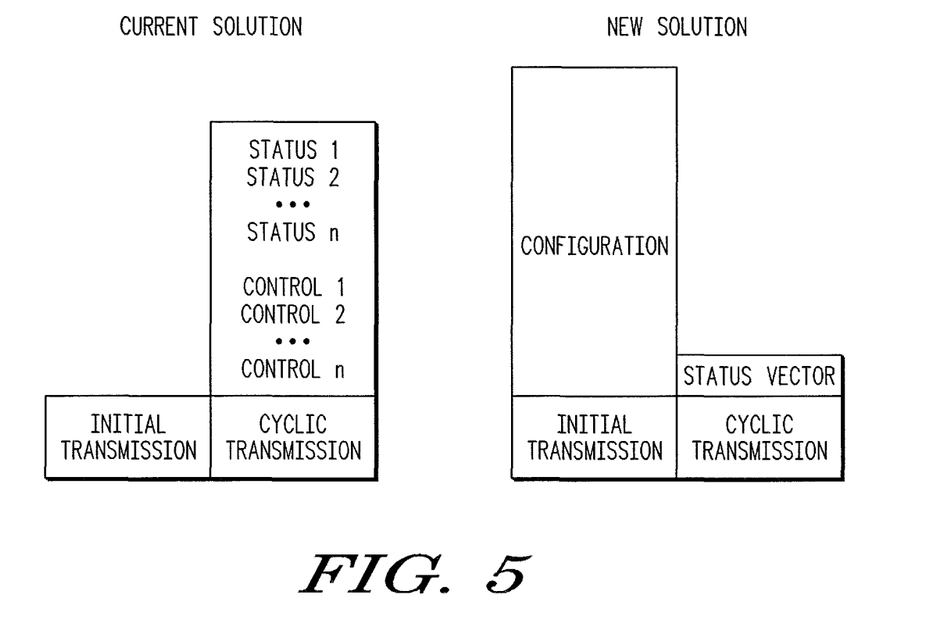
FIG. 5 is a diagrammatic representation of the data sent between devices according to an embodiment of the present invention compared to a prior art solution.

FIG. 5 compares the diagnosis information (i.e. operational status information) transmission loads for the prior art versus the present invention. As can be seen from the figure, the solution presented by the invention moves the bulk of the information transmitted to the start-up/initialisation period. This leaves the periodic, i.e. cyclic, transmission periods with far less information to carry. This greatly improves (i.e. reduces) the diagnostic function resource usage, in operation.

The status vector is the unique signature derived from the operational status information described in more detail below.

Figure 6:
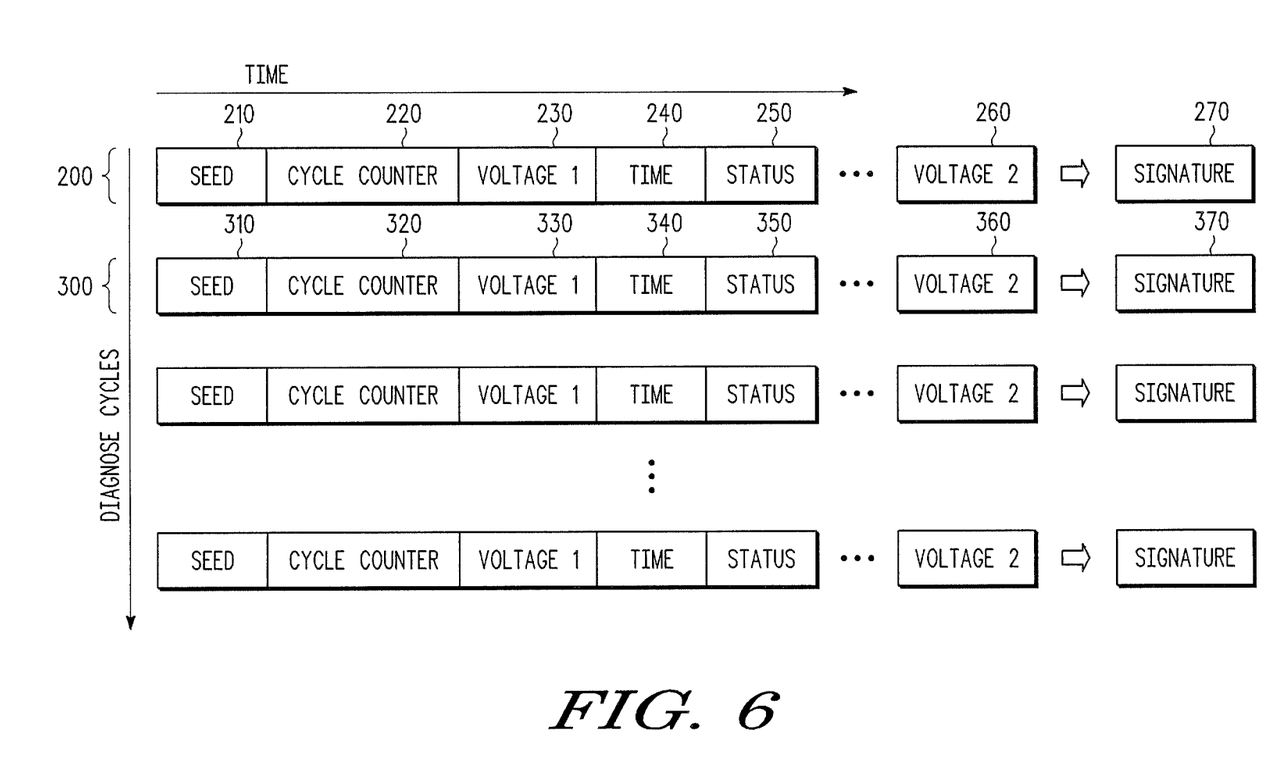
FIG. 6 is a schematic representation of exemplary data types used to produce a signature according to an embodiment of the invention.

FIG. 6 shows an example of the signature creation process within the operational status information compression unit 70.

The signature is created from the raw operational status information values. These values may be static, i.e. not changing over time, or dynamic, i.e. changing over time. Although it is possible to pre-calculate both static and dynamic values in the distributed system 1 design phase, doing so for dynamic values is more difficult to achieve. Thus dynamic values might be partitioned off for pre-calculation on the fly during operation, whereas static values are pre-calculated and stored in a memory.

Static values include data on such things as: Analog to Digital Converter (ADC) values (voltage regulator); status flags (i.e. sensor overcurrent, Warning Lamp outputs, output monitoring, etc); master microcontroller configuration (e.g. CAN, SPI, Timer); MCU subroutine information (e.g. order of execution); watchdog timing values.

Dynamic values include data on such things as: Analog to Digital Converter values (coil voltage); Diagnosis results (e.g. coil or failsafe relay diagnosis); keep alive data; system time; coarse wheel speed values, status flags of any kind, and the like.

For the embodiment of a CRC calculated signature, a seed is provided. The seed is a unique starting point for creating the CRC signature. The seed may remain constant over time and device, or change, depending on the requirements of the system. A cycle counter value may also be used to allow differentiation between different signatures.

In FIG. 6, a seed and cycle counter value are added to the front of a string including the operational status information, which in the example shown in FIG. 6 include the time, status bits and a digital voltage representation.

This provides the serialized data stream as used in the CRC calculation. In case parallel data is used as input for the CRC calculation, the serialised data stream of status information is subdivided into the parallel data portions used by the CRC and fed from left to right. Any CRC implementation can be used, as well as any other functions that generate a unique number, such as MD5 or SHA-1 hash functions.

The final signature size is open ended, i.e. may be of any bit length, depending on the amount of data to be sent. Different signatures are differentiated from one another by a recognisable portion, such as the seed value, or cycle counter value.

Alternatively, in the case where one device (e.g. MCU 20 or mixed signal device 100) in the system requests the signature from another device, the request can implicitly define a particular signature.

In an embodiment, the above described additional modules, i.e. the diagnosis controller 110 having an operational status compression unit 70 and bypass unit 80, and the comparison circuit 90, are all formed from a processor and associated memory containing instructions to carry out the particular functions required. In this way, the scope of the functions of each unit may be changed during operation of the system by updating the instructions, or code, in the associated memory. Equally, however, each unit may be formed from its own processor and associated memory, or the units may share processor and/or memory. Furthermore, the associated memory may be used to store any pre-calculated expected signatures and the like.

Updating of the system code, including the diagnosis code, may occur at any time, although, typically, the code would be updated on system initialisation. This update code is referred to as configuration data. The system code may be secured by CRC signature as well, to prevent errors.

Figure 7:
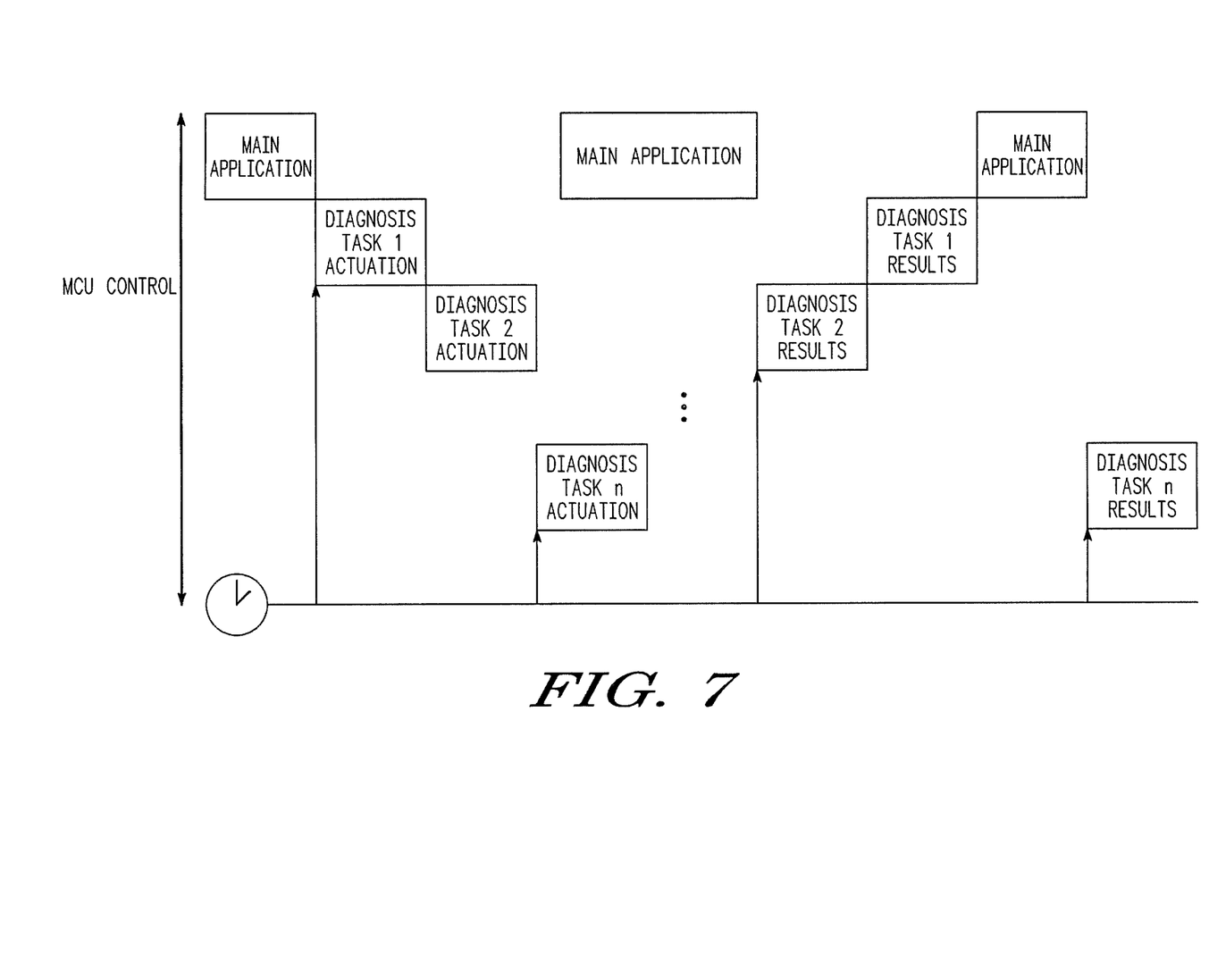
FIG. 7 is a diagrammatic representation showing how a distributed system's application executes on the master microcontroller unit (MCU) in the prior art.

FIG. 7 shows the execution of the diagnosis function in a distributed system 1 having a mixed signal device 10 according to the prior art. It can be seen from this figure that the execution of the main application (i.e. the system functions the distributed system is supposed to carry out, in operation) by the MCU 20 in the prior art is interrupted by the MCU 20 having to service the diagnosis function tasks in a timely manner. This is to say, the trigger and response or other diagnosis tasks, particularly tightly time coupled diagnosis tasks, interrupt the execution of the main application in the MCU 20, and therefore involve time consuming context changes (e.g. register status storage, register value flushing, register value restoration, etc), and the like. This causes delays in the operation of the main application. In relatively good scenarios, this only leads to both the main application and diagnosis tasks taking a little longer than expected. In worse scenarios, this can lead to extreme delays and even complete blockages of the main application or diagnosis tasks.

Figure 8:
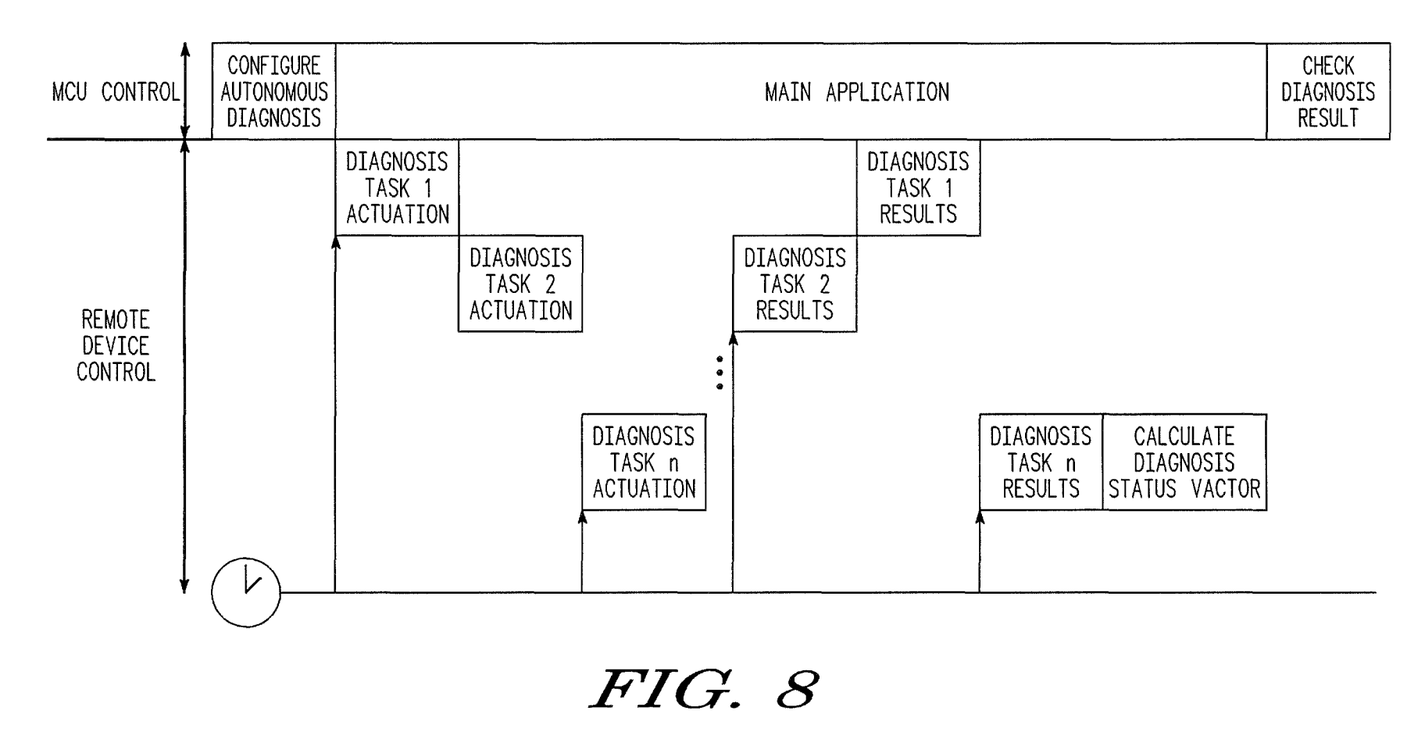
FIG. 8 is a diagrammatic representation showing how a distributed system's application executes on the master microcontroller unit (MCU) according to an embodiment of the present invention.

FIG. 8, however, shows the execution of a similar diagnosis function, but this time on a distributed system 1 having a mixed signal device 100 according to the invention. Now, the main application is executed continuously by the master MCU 20, with the diagnosis tasks each being carried out by the diagnosis controller 110 local to the respective mixed signal device 100. The local diagnosis controller report their result back to the master MCU 20, for checking/analysis. In this way, the master MCU 20 is relieved of the overheads of carrying out the whole diagnosis function.

However, it will be noticed that there is both an initialisation period at the beginning, and a diagnosis result check at the end, for the master MCU 20 to carry out. The initialisation at the beginning provides the local diagnosis controller 110 of the mixed signal device 100 with the necessary information to carry out the required diagnosis task, as described above. This may be a simple instruction as to which (pre-known/stored) diagnosis function to carry out, or it may even include programming the necessary diagnosis function in to the local diagnosis controller 110. This programmability of the diagnosis function has advantages, in the case where changes to the diagnosis function might be required over the course of the lifetime of the mixed signal device 100 or distributed system 1 having the mixed signal device 100 therein.

Meanwhile, the diagnosis check result task at the end is where the master device (e.g. MCU 20) checks the diagnosis result previously received from each remote device using the comparison circuit 90.

Figure 9:
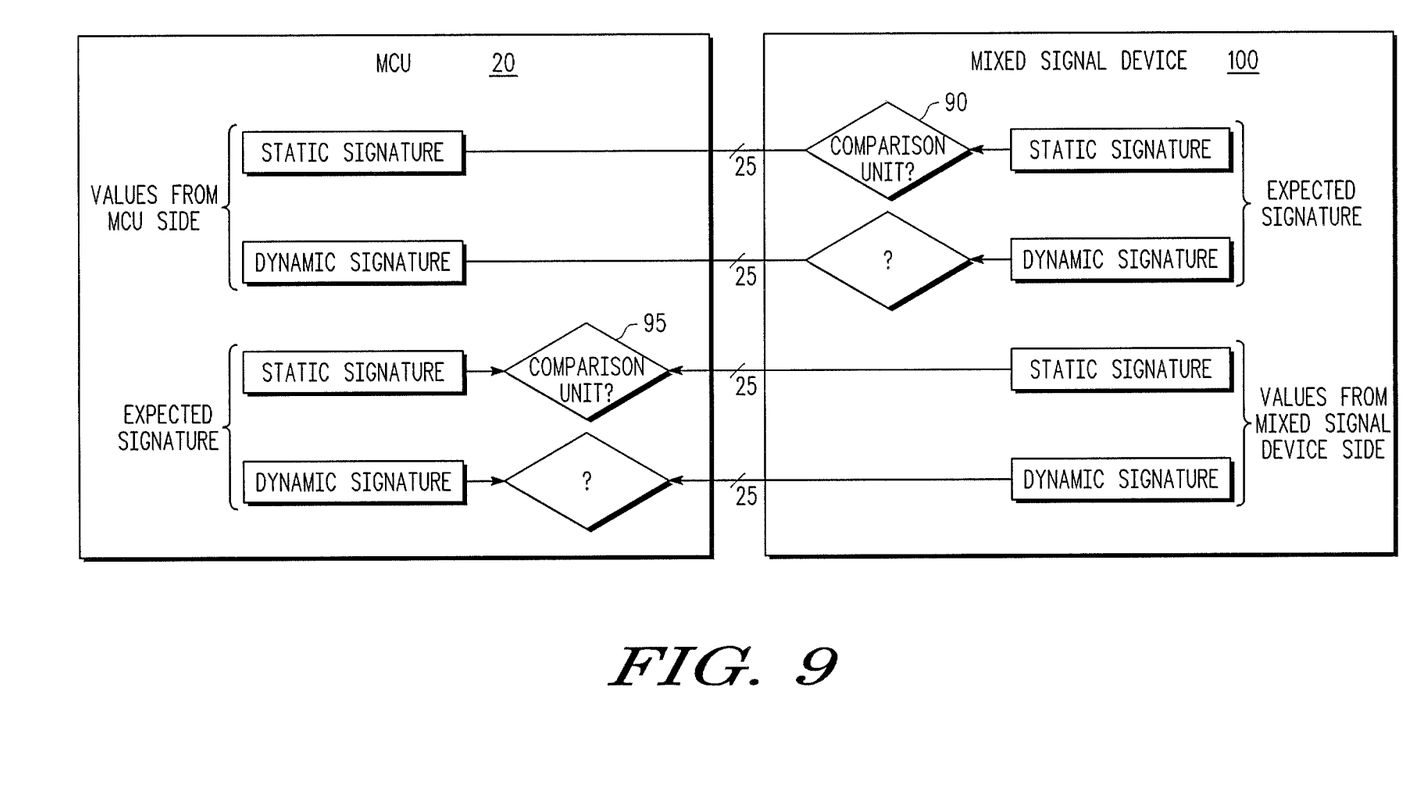
FIG. 9 is a schematic block diagram showing cross checking of signatures sent between devices according to an embodiment of the invention.

FIG. 9 shows schematically the case where a remote mixed signal device 100 and MCU 20 according to an embodiment of the invention cross check one another's operational status information.

In FIG. 9, signatures generated in the MCU 20 are sent over the SPI communication link 25 to the remote mixed signal device 100, having a comparison circuit 90 as described above, and are checked for integrity in the remote mixed signal device 100. Conversely, the remote mixed signal device 100 sends signatures to the MCU 20, again over the SPI communication link 25, for checking at the MCU 20 end.

Typical examples of the type of value checks carried out at the remote mixed signal device 100 end would be: configuration data mismatch check (i.e. the incoming update data is checked for integrity); correct code order execution in the MCU 20; code runaway checks (i.e. checking for key subroutine execution, or interrupt routines); course check of ADC values, such as voltage regulator values; course checks on timing of watchdog transfers.

Typical examples of the type of value checks carried out at the MCU 20 (or other remote mixed signal device 100) end would be: actuator status; bias voltage values; or the checking of status flags of any kind.

In this way, the remote mixed signal device 100 can ascertain that the MCU 20 is functioning correctly, and the MCU 20 can ascertain that the remote mixed signal device 100 is operating correctly. Any mismatch between the sent signatures and the expected signatures will indicate an error in the system.

Where required, the diagnosis function can be overridden by the master controller, e.g. MCU 20, by forwarding respective commands to the relevant remote mixed signal device 100 over the SPI communication link 25.

In an embodiment, the mixed signal device according to the present invention is manufactured on a single die. However, due to the fact that some analog or digital portions of the mixed signal device might require more specialised, or expensive, manufacturing processes compared to the remaining portions, mixed signal devices may be manufactured in a single package, incorporating different semiconductor dies. This commonly occurs when the actuator or analog device 40 . . . 43 is a high powered device, such as those found in airbag squib detonator circuits. Thus, the first die may be optimised for the requirements and characteristics of the high powered analog module portion and the second die may be optimised for the requirements and characteristics of the digital portions.

For example, the first die may be manufactured using simpler and cheaper technology, such as a vertical discrete MOSFET technology like HDTMOS technology and the second die may be manufactured using a SMARTMOS technology developed by Freescale Semiconductor Inc.

Thus, the advantages of the more complex technology may be used to provide high integration and additional functionality for the digital portions and the cheaper technology may be used for high powered analog module portion, which due to the energy dissipation requirements, is required to be a larger device.

Alternatively, the mixed signal device of the present invention may be realised in separate packages, but co-located on a single circuit board having an shared communications link to the MCU 20, for example an SPI link.

From the above description, it can be seen that the disclosed distributed system 1 is operable to allow a master controller device, for example a MCU 20, and at least one mixed signal device to cross check each other's operational status information and provide indicia of validity of the operational status of the system as a whole to the master controller, which can then act upon this information in an appropriate manner. The invention is particularly suited to distributed systems 1 operating over low bandwidth communications links.

The above described embodiments of the invention provide a fast and reliable local operational status validation (diagnosis) approach for linked devices, capable of securing a large amount of data and inputs.

Whilst the present invention is operable to reduce transmission bandwidth requirements (thus enabling the low bandwidth communication links typically used in distributed systems to be sufficient to provide timely diagnosis information), the present invention may be equally used with high bandwidth links to enable more diagnosis tasks to be carried out per unit time. Thus diagnosis can be carried out to a finer granularity when higher bandwidth communication links are employed between the devices within the distributed system. Examples of suitable high bandwidth communications links include FlexRay, Ethernet, Ultra Wideband (UWB), and the like. Wireless links may also be used as exemplified by the UWB example above.

Moreover, when using high bandwidth links between the devices (one or more remote devices 100 and MCU 20), a further advantage is that the Quality of Service (QoS) and latency of the high bandwidth links improves. This is because the data sent over the links is smaller, and therefore does not interrupt the transmission of other data over the high bandwidth for as long as they would otherwise. For example, in a vehicle, high bandwidth Flexray links maybe employed to carry both the vehicles electronic management information, as well as multimedia information such as video streams to one or more output devices located in the vehicle, such as headrest mounted LCD screens or the like. In this case, the invention would be reducing jitter on the video playback.

The invention may for example be used in mixed signal systems where an MCU is used to control a companion chip as a linked device, i.e. Airbag, Braking systems and others. These safety relevant systems require a tight operation coupling with minimum status synchronisation and surveillance overhead. However it can be used likewise for synchronising any other devices, for example, multiple MCU's or multicore systems.

Determination of the operational status information may also be called distributed operation surveillance (of the system as a whole), which is used to ensure correct operational coupling of the linked devices.

In the foregoing specification, the invention has been described with reference to specific examples of embodiments of the invention. It will, however, be evident that various modifications and changes may be made therein without departing from the broader spirit and scope of the invention as set forth in the appended claims.

For instance, whilst the above has been described in terms of a remote mixed signal device, having both analog and digital portions, it would be apparent to the skilled person that any distributed system may benefit from the teachings of the present invention, such as an all digital system of multiple processors located at different ends of low bandwidth communication links. In the foregoing, low bandwidth links are to be construed as meaning communication links that are insufficient in size to carry all the uncompressed data.

Also, for instance, the connections may be an type of connection suitable to transfer signals from or to the respective nodes, units or devices, for example via intermediate devices. Accordingly, unless implied or stated otherwise the connections may for example be direct connections or indirect connections.

In the claims, any reference signs placed between parentheses shall not be construed as limiting the claim. The word 'comprising' does not exclude the presence of other elements or steps then those listed in a claim. The term "coupled," as used herein, is not intended to be limited to a direct coupling or a mechanical coupling. Unless stated otherwise, terms such as "first" and "second" are used to arbitrarily distinguish between the elements such terms describe. Thus, these terms are not necessarily intended to indicate temporal or other prioritization of such elements. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A device comprising:
    at least one analog module at an integrated circuit;
    a diagnosis controller of the integrated circuit coupled to the at least one analog module, said diagnosis controller to generate operational status information of the at least one analog module based on an operational status of the least one analog module;
    a comparison circuit of the integrated circuit operable to compare operational status information received from another diagnosis controller of a different integrated circuit about another module at the different integrated circuit against expected pre-calculated operational status information of the other module; and
    a communication module coupled to the diagnosis controller to receive the operational status information from the other diagnosis controller and to transmit the operational status information of the at least one analog module to the different integrated circuit for comparison.

2. The device of claim 1, wherein the device further comprises a timer, and the diagnosis controller is arranged to determine operational status information of the at least one analog module according to a predetermined timed schedule, using an output of the timer.

3. The device of claim 2, wherein the timer is synchronous with a master timer for the integrated circuit.

4. The device of claim 2, wherein the device has at least two analog modules and a multiplexer to multiplex an operational status of one of the at least two analog modules to the diagnosis controller.

5. The device of claim 1, wherein the device has at least two analog modules and a multiplexer to multiplex an operational status of one of the at least two analog modules to the diagnosis controller.

6. The device of claim 1, wherein communications links between the integrated circuit and the different integrated circuit are low bandwidth links.

7. The device of claim 6, wherein the communications links are Serial Peripheral Interface (SPI) links.

8. The device of claim 6, wherein the operational status information of the at least one analog module is sent to the different integrated circuit only upon request by the other diagnosis controller.

9. The device of claim 1, wherein communications links between the integrated circuit and the different integrated circuit are high bandwidth links and wherein operational status information is sent to the different integrated circuit continuously.

10. The device of claim 1, wherein the diagnosis controller comprises a processor and a memory containing instructions for execution by the processor to generate the operational status information.

11. The device of claim 10, wherein the memory is a programmable memory, and wherein the instructions are updateable in operation and/or include pre-calculated expected compressed operational status information.

12. The device of claim 11, wherein the instructions are secured prior to updating the instructions using Cyclic Redundancy Check protection.

13. The device of claim 1, further comprising an operational status compression unit operable to compress the generated operational status information.

14. The device of claim 13, wherein the operational status compression unit is a signature calculating unit operable to produce a compacted signature indicative of the operational status information.

15. The device of claim 1, wherein the diagnosis controller is operable to control the at least one analog module.

16. The device of claim 1, wherein the at least one analog module comprises at least one of:
    a power module;
    an actuator module; and
    an air bag squib detonator.

17. The device of claim 1, wherein:
    the different integrated circuit comprises a master controller; and
    the diagnosis controller carries out diagnosis of the at least one analog module under supervision of the master controller.

18. A method comprising:
    determining operational status information of an analog module at an integrated circuit by using a diagnosis controller at the integrated circuit;
    sending the determined operational status information to a different integrated circuit for comparison with pre-calculated expected operational status information for the analog module; and
    comparing by a comparison circuit of the integrated circuit operational status information received from the different integrated circuit against expected pre-calculated operational status information for another module at the different integrated circuit.

19. A device comprising:
    a plurality of analog modules at an integrated circuit; and
    a diagnosis controller at the integrated circuit coupled to the analog modules, the diagnosis controller to schedule requests for operational status from the analog modules, to receive operational status from the analog modules, to generate operational status information based upon the received operational status, the operational status information to be transmitted to at least one master controller, to receive commands about receiving and transmitting operational status from the master controller, and to carry out control commands received from the at least one master controller.

20. The device of claim 19, the device further comprising a comparison circuit operable to compare operational status received from the master controller against expected pre-calculated operational status for the master controller.

* * * * *